United States Patent
Kobayashi

(10) Patent No.: US 9,218,311 B2
(45) Date of Patent: Dec. 22, 2015

(54) PACKET-BASED DIGITAL DISPLAY INTERFACE SIGNAL MAPPING TO MICRO SERIAL INTERFACE

(71) Applicant: STMicroelectronics, Inc., Coppell, TX (US)

(72) Inventor: Alan Osamu Kobayashi, Los Altos, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 0 days.

(21) Appl. No.: 14/045,070

(22) Filed: Oct. 3, 2013

(65) Prior Publication Data
US 2014/0032945 A1    Jan. 30, 2014

Related U.S. Application Data

(62) Division of application No. 12/862,087, filed on Aug. 24, 2010, now Pat. No. 8,578,031.

(60) Provisional application No. 61/300,929, filed on Feb. 3, 2010, provisional application No. 61/318,727, filed on Mar. 29, 2010, provisional application No. 61/325,734, filed on Apr. 19, 2010, provisional application No. 61/365,195, filed on Jul. 16, 2010.

(51) Int. Cl.
*G06F 13/40* (2006.01)
*G06F 1/26* (2006.01)
(Continued)

(52) U.S. Cl.
CPC .............. *G06F 13/4081* (2013.01); *G06F 1/26* (2013.01); *H01R 11/00* (2013.01); *H04N 7/173* (2013.01)

(58) Field of Classification Search
CPC ............................... G06F 13/4081; G06F 1/26
USPC .......................................................... 709/227
See application file for complete search history.

(56) References Cited

U.S. PATENT DOCUMENTS

| 7,953,900 | B2 | 5/2011 | Qureshi |
|---|---|---|---|
| 2006/0039468 | A1 | 2/2006 | Emerson et al. |

(Continued)

FOREIGN PATENT DOCUMENTS

| TW | 200420962 | 10/2004 |
|---|---|---|
| TW | 200912882 | 3/2009 |

(Continued)

OTHER PUBLICATIONS

Notice of Allowance in Taiwan Application No. 100118481 dated Feb. 11, 2014.

(Continued)

*Primary Examiner* — Asghar Bilgrami
(74) *Attorney, Agent, or Firm* — Seed IP Law Group PLLC

(57) ABSTRACT

A passive cable adaptor for connecting a data source device with a display device is described. The adaptor has a packet-based interface connector at one end, the connector having a positive main link pin, a negative main link pin, a positive auxiliary channel pin, and a negative auxiliary channel pin. At the other end is a micro serial interface connector, wherein multimedia content is transmitted over the cable adaptor and electrical power is supplied over the cable adaptor simultaneously. The cable adaptor has an auxiliary and hot plug detect (HPD) controller utilized to map the auxiliary channel and HPD signals of the packet-based digital display to the micro serial interface ID signal.

21 Claims, 13 Drawing Sheets

(51) Int. Cl.
  *H01R 11/00*  (2006.01)
  *H04N 7/173*  (2011.01)

(56) References Cited

U.S. PATENT DOCUMENTS

| | | |
|---|---|---|
| 2007/0200860 A1 | 8/2007 | Kobayashi |
| 2008/0196086 A1 | 8/2008 | Shintani et al. |
| 2010/0109795 A1* | 5/2010 | Jones .................... G06F 13/409 333/101 |
| 2010/0151723 A1 | 6/2010 | Su et al. |
| 2010/0283894 A1* | 11/2010 | Horan .................... H04L 25/02 348/441 |
| 2011/0078536 A1 | 3/2011 | Han et al. |
| 2011/0145459 A1* | 6/2011 | Conti et al. ................... 710/261 |
| 2011/0181520 A1* | 7/2011 | Boda et al. ................... 345/173 |
| 2011/0191814 A1 | 8/2011 | Kobayashi |
| 2012/0077384 A1* | 3/2012 | Bar-Niv ................. H01R 27/00 439/625 |
| 2012/0203937 A1 | 8/2012 | Mohanty et al. |

FOREIGN PATENT DOCUMENTS

| | | |
|---|---|---|
| TW | 200919439 | 5/2009 |
| TW | 2009049822 | 12/2009 |

OTHER PUBLICATIONS

Taiwan IPO Search Report in Taiwan Application No. 100118481 dated Feb. 11, 2014.
Hewlett-Packard Company, Intel Corporation, Microsoft Corporation, NEC Corporation, ST-NXP Wireless, Texas Instruments, "Universal Serial Bus 3.0 Specification," Revision 1.0, Nov. 12, 2008, especially section 5.3.4.2, 2 pages.
Vesa, "Vesa DisplayPort Standard," Version 1, Revision 1a, Jan. 11, 2008, especially section 4.2.1.1, 2 pages.

* cited by examiner

PACKET-BASED DIGITAL DISPLAY INTERFACE SIGNAL MAPPING TO MICRO SERIAL INTERFACE

CROSS-REFERENCE TO RELATED APPLICATION(S) AND CLAIM OF PRIORITY

The present application is a divisional of U.S. patent application Ser. No. 12/862,087, entitled "PACKET-BASED DIGITAL DISPLAY INTERFACE SIGNAL MAPPING TO MICRO SERIAL INTERFACE," filed on Aug. 24, 2010, which claims priority under 35 U.S.C. §119(e) to Provisional Patent Application No. 61/300,929, filed Feb. 3, 2010, titled "Signal Mapping Between Display Port and USB3.0 Compliant Devices", Provisional Patent Application No. 61/318,727, filed Mar. 29, 2010, titled "DP Signal Mapping Onto a USB Connector", to Provisional Patent Application No. 61/325,734, filed Apr. 19, 2010, titled "DP Signal Mapping Onto MicroUSB2.0 Connector", and to Provisional Patent Application No. 61/365,195, filed Jul. 16, 2010, titled "Display Port Aux Ch Handshake for Negotiating a Higher Power Supply Voltage", all of which are incorporated herein by reference in their entireties. Application Ser. No. 12/862,087 is assigned to the assignee of the present application and is hereby incorporated by reference into the present application as if fully set forth herein. The present application hereby claims priority under 35 U.S.C. §120 to U.S. patent application Ser. No. 12/862,087.

TECHNICAL FIELD OF THE INVENTION

The present invention relates generally to communication of various types of data in a multimedia network. More specifically, it relates to communicating data directly between a multimedia device and an external display device.

BACKGROUND OF THE INVENTION

Many multimedia devices are becoming increasing popular. Such devices are being used more frequently as devices for taking and storing videos, picture, music files and software applications ("apps") and the like, for a wide variety of functions, and so on. Currently, these devices have various ports for data transfer. They are used for powering the device or backing up data. They are also used for transmitting data onto and from phones.

Some of these ports support standards which currently have one differential pair, D+ Diff_pos) and D–(Diff_neg). Upgraded versions of these standards may be significantly faster and full duplex. They may support a Tx and Rx pair which allows data to be sent without first having to wait for a reply. This enables extremely quick downloads of digital video, such as movies and other high-volume data, and makes the devices even more multimedia-centric. For example, multimedia device manufacturers are beginning to incorporate these standards into their phones, and it is expected that users will want to be able to download or show pictures, videos, and other content directly to an external display device from their devices (without use of a computer or other component). Micro versions of these standards are also gaining wide acceptance in the marketplace. It is expected that users will want to be able to download multimedia content directly from mobile devices on to an external display device. Thus, it would be desirable to be able to map digital multimedia content onto micro versions of these standards from a packet-based digital display interface and supply power from the display device to the mobile device simultaneously.

SUMMARY OF THE INVENTION

In one aspect of the invention, methods of enabling transmission of multimedia or other types of data and enabling the supply of power between a data source device and an external display device are described. Main link signals of a packet-based interface are mapped to a micro serial interface ID pin. A hot plug detect (HPD) signal of the packet-based interface is mapped to the MicroUSB2.0 ID pin. These mappings enable transport of the data stream from the data source device to the external display device. Power is supplied from the external display device to the source device using a micro serial interface connection while simultaneously transporting the data stream.

In one embodiment, an auxiliary channel positive signal is mapped to a first differential I/O signal and an auxiliary channel negative signal is mapped to a second differential I/O signal. In another embodiment, sideband communications are completed before main link transmission of multimedia content begins. In another embodiment, power is supplied over a packet-based interface power pin to a Vbus pin. In yet another embodiment, an auxiliary/HPD controller is utilized for mapping the HPD signal and for mapping the auxiliary channel signals.

Another aspect of the present invention is a cable adaptor for connecting a data source device with a display device. The cable adaptor has a packet-based interface connector at a first end having a positive main link pin, a negative main link pin, a positive auxiliary channel pin, and a negative auxiliary channel pin. At the second end, the cable adaptor has a micro serial interface connector, wherein multimedia content is transmitted over the adaptor and electrical power is supplied over the adaptor simultaneously. The adaptor also has an auxiliary and HPD controller having a specific number of signals.

In one embodiment, the packet-based interface connector has a pin for HPD signals. The main link positive signal is mapped to a positive differential signal. In one embodiment, the auxiliary and HPD controller has two differential input/output signals, an ID signal, and an HPD signal.

In one aspect of the invention, methods of enabling transmission of multimedia or other types of data and enabling the supply of power between a data source device and an external display device are described. In particular embodiments suitable for enabling more than one power level to be transmitted to a source device by a display are disclosed.

In one embodiment, a multimedia data source device comprises a multimedia data processor suitable for providing multimedia data and operating using a negotiated power from an external display device. Also comprising power level determination circuitry for negotiating a power level to be received from the external display device enabling operating of the multimedia data source device. Further comprising an interface system suitable for coupling with the external display device. Further comprising an interface system suitable for coupling with the external display device. The interface enabling a main data link, a power connection suitable for receiving the negotiated power from the external display device, and an auxiliary channel suitable for transmitting sideband data between the external display device and the source device.

Another aspect of the present invention is a multimedia data display device with a display media suitable for displaying multimedia content and power level determination circuitry for negotiating a power level to be transmitted by the display device to a source device to enable operation of source. Further comprising an interface system suitable for coupling the display with the external display device. The interface enabling a main data link, a power connection suitable for transmitting the negotiated power to a source device, and an auxiliary channel suitable for transmitting sideband data between the display device and the source device.

In another aspect, the invention describes a method of enabling power transmission at a negotiated power level from a display device to a connected source device. The method includes establishing a connection between a multimedia data source device and an external display device, the connection comprising a power connection and an auxiliary data connection. Then a power level is negotiated for power transmission from the display device to the source device to enable operation of the multimedia data source. Once negotiated, the negotiated power is transmitted from the external display device to the source device.

General aspects of the invention include, but are not limited to methods, systems, apparatus, and computer-readable media for enabling message transmission in multimedia device networks.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE INVENTION

Reference is made to particular embodiments of the invention. One example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

Aspects of the invention pertain to methods and apparatus for enabling transmission of data from a source to sink and simultaneously enabling the supply of power from the sink to the source. The source supports a packet-based interface and an enhanced serial interface. The sink supports the same packet-based interface and is a serial interface host and is able to supply power to the source, as described in greater detail below. The invention is an apparatus, referred to as a passive cable adaptor that has an enhanced serial interface plug connection at one end that connects to a device, such as a multimedia device, and at the other end has two connectors: a packet-based interface plug connection and a serial interface plug connection, both of which connect to the external display device.

In one embodiment, methods for mapping a 1-lane main link packet-based display signal onto a enhanced serial interface connector for enabling connectivity from a packet-based source packet-based display interface/enhanced serial interface equipped handheld device to an external packet-based display interface-enabled and serial interface display device are described. The methods allow for the simultaneous operations of a packet-based source interface isochronous transport of multimedia audio-visual (AV) streams and serial interface operation while the mobile phone is powered by the external display device. The AV stream may have High-bandwidth Digital Content Protection (HDCP) content protection.

Figure 1:
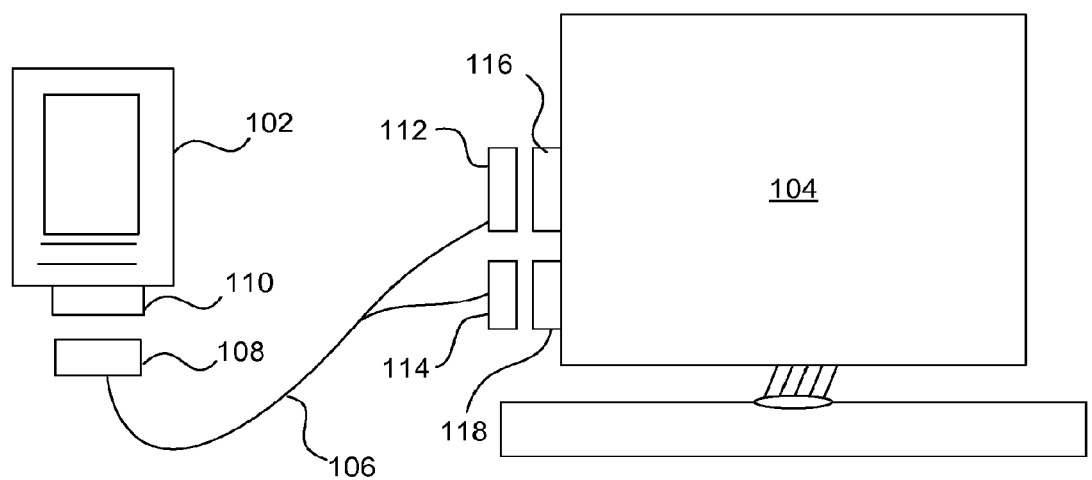
FIG. 1 is a simplified network diagram showing a multimedia device connected to an external display device via a cable in accordance with one embodiment.

FIG. 1 is a simplified network diagram showing a multimedia device connected to an external display, such as a TV, via a passive cable adaptor. The various embodiments described herein related to methods and components in the passive cable adaptor. A multimedia device 102 is a multimedia-centric computing device capable of performing numerous functions in addition to being a mobile phone. In other embodiments, it may be an IP-enabled computing device, such as a tablet or mobile gaming device. In other embodiments, it may not be IP-enabled and may simply be a multimedia handheld device used primarily for taking pictures and video, storing and watching movies and other audio-visual content, storing and reading electronic versions of books and periodicals (e-books), storing and listening to music, and so on. Multimedia device 102 is a packet-based interface source (hereafter "packet-based source") and an enhanced serial interface capable device. Component 110 in multimedia device 102 is a standard enhanced serial interface receiving connector, the type of connector many mobile phone and handheld device manufactures are or will be providing on their devices due to its significant advantage over the previous generation serial interface. This connector or component 110 is commonly referred to as simply a serial interface port. As noted, in one embodiment, multimedia device 102 is a source device for multimedia content that transmits data to a sink device, where the content is played or displayed.

In one embodiment, the sink device is an external display device 104, such as a TV or a computer monitor. In the described embodiments, external device 104 is a standard serial interface host. It may also be an enhanced serial interface host, which would make it capable of being a host for 2.0 (since 3.0 is a superset of 2.0). Display device 104 has two connectors relevant to various embodiments of the present invention. One is a packet-based display interface source receiver connector 116. The other is a serial interface receiver connector 118. These connectors are described in greater detail below.

The external display device 104 and multimedia device 102 are connected by a passive cable adaptor 106. At one end of cable 106 is an enhanced serial interface plug connector 108 which is capable of coupling to receiver connector 110 of multimedia device 102. At the other end are two plugs: a packet-based interface source plug connector 112 and a serial interface plug connector 114. Plug connector 112 is capable of coupling with the interface source's receiving connector 116 and plug connector 114 can couple with serial interface receiver connector 118. Multimedia content is transmitted from multimedia device 102 to display device 104 where it is displayed and, simultaneously, power is provided from display device 104, for example a TV, to multimedia device 102. The amount of power supplied depends on the configuration and use of pins in receiver connectors 116 and 118 in display device 104 and in connector 110 in multimedia device 102. These configurations are described in detail below. Generally, in the described embodiment, the amount of power provided may range from 3.3V/500 mA to a total of 8.3V/500 mA.

Figure 2:
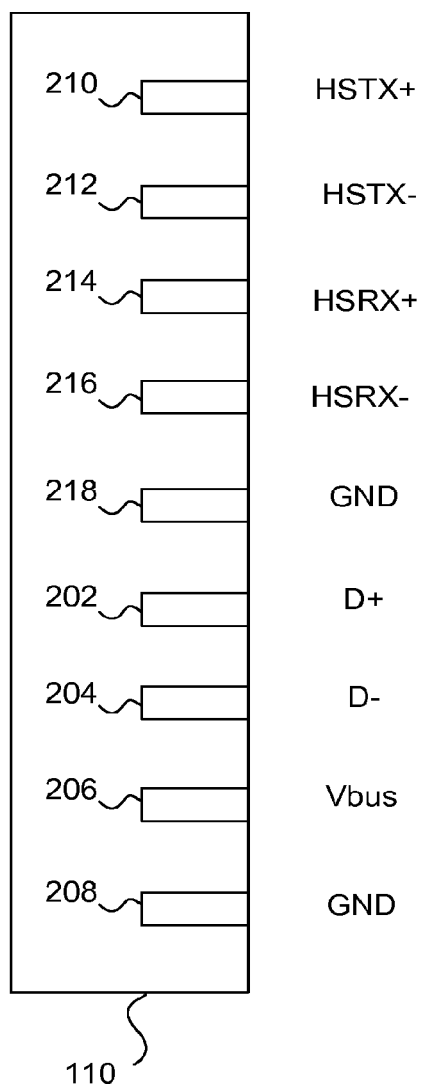
FIG. 2 is a block diagram of a serial interface receiver connector component of a multimedia device.

FIG. 2 is a block diagram showing pin connector designations of enhanced serial interface receiver connector 110 of multimedia device 102. Enhanced serial interface has a serial interface backward compatible portion. This portion includes the half-duplex, bi-directional pins, D+ 202 and D− 204. This differential pair is capable of transmitting data at 480 Mbps. Also part of this backward compatible portion is a Vbus pin 206 and a GND (ground) pin 208. The role of these pins is described in the figure below.

The enhanced serial interface extension portion is composed of the remaining five pins. There is a high-speed TX+ pin 210 ("HSTX") and high-speed TX− pin 212 pair for transmitting data from a host or source device, such as multimedia device 102 to a sink or hub device, such as multimedia device 102 to a sink or hub device, such as external monitor 104. HSTX+ 210 and HXTX− 212 are AC-coupled and can transmit data at 5 Gbps. A high-speed RX+ pin 214 and a high-speed RX− pin 216 ("HSRX") comprise a pair for receiving data from a hub/sink device (e.g., TV 104) at the host (e.g., multimedia device 102) and is also AC-coupled and can transmit data at 5 Gbps. This pair (HSRX+ 214 and HSRX− 216) and the pair HSTX+ pin 210 and HSTX− pin 212 comprise a full-duplex, bi-directional coupling between multimedia device 102 and external device 104. That is, data can be transmitted in both directions at the same time, unlike in the serial interface protocol, providing for a speed that is faster than the increase in actual transmission speed (458 Mbps vs. 5 Gbps). There is also a GND pin 218 that is part of the enhanced serial interface extension portion.

Figure 3A:
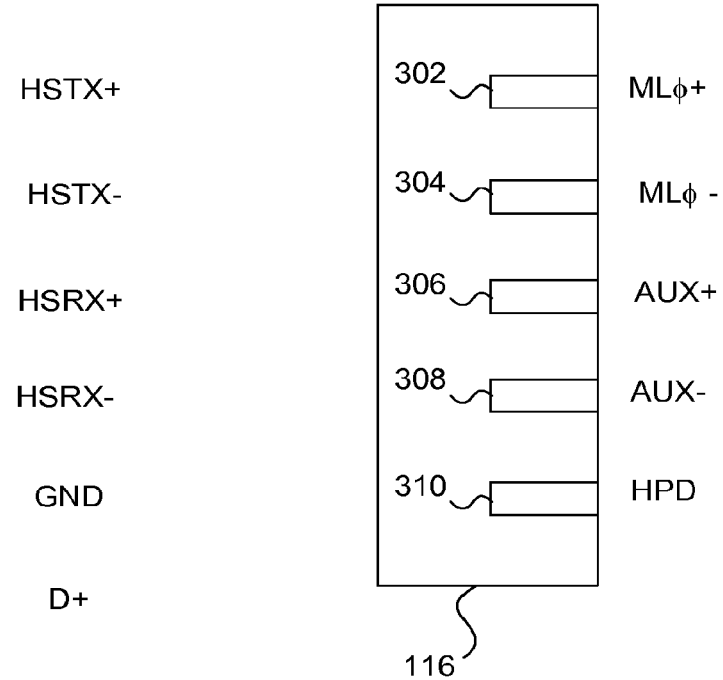
FIG. 3A is a pin diagram of a packet-based display interface receiver connector of an external display in accordance with one embodiment.

Moving now to packet-based display interface source receiving connector 116 of external display 104, there are five pins as shown in FIG. 3A. A main link lane0+ (ML0+) pin 302 and a main link lane0− (ML0−) pin 304 are used for transmitting data from a source to a sink at 5.5, 2.7, or 1.62 Gbps and are AC-coupled. ML0+/− pins are specific to a packet-based digital interface described below. There is also an auxiliary channel pair which functions as a bi-directional side-band channel in the packet-based digital interface protocol. An AUX CH+ pin 306 and AUX CH− pin 308 pair enable 1 Mbps transmission and are half-duplex and bi-directional. There is also a pin 310 for hot plug detect (HPD) from external display device 104 (sink) to multimedia device 102 (source). IN this embodiment, there is no connection for DP_PWR (part of the packet-based display interface). In one embodiment, the power source from sink to source is 3.3V/500 mA. The interface referred to herein is a packet-based, serial digital display interface that is open and scalable and supports plug and play. Unlike conventional display interfaces that transmit a single video raster plus timing signals (e.g., Vsync, Hsync, DE, etc.), the packet-based interface referred to herein provides multi-stream packet transfer capable of transferring one or more packet streams simultaneously in the form of virtual pipes or lanes established within a physical link or main link. A number of data streams are received (from a source device) at a transmitter (a component of the physical link) that, if necessary, packetizes each into a corresponding number of data packets. The data packets are then formed into corresponding data streams, each of which are passed by way of an associated data lane to a receiver (also a component of the physical link).

The link rate (i.e., the data packet transfer rate) for each virtual link or lane can be optimized for the particular data stream resulting in the physical link carrying data streams, each having an associated link rate (each of which may be different depending on the particular data stream). Thus, the link rate is independent of the native stream rates. In this way, the packet-based interface provides a scalable medium for the transport of video, graphics, audio, and application data. The interface also supports hot-plug detection (HPD) and automatically sets the physical link (or pipe) to its optimum transmission rate. The interface provides for low pin count and purely digital display interconnect for all displays, including HDTV. The packet-based nature of the interface provides scalability to support multiple, digital data streams such as multiple video/graphics streams and audio streams for multimedia applications. In addition, a USB transport for peripheral attachment and display control can be provided without the need for additional cabling.

One feature of the packet-based, display interface is that it has an auxiliary channel logical sub layer. The major functions of the auxiliary channel include data encoding and decoding, framing/de-framing of data and two options for auxiliary channel protocol. One is a standalone protocol (limited to link setup/management functions in a point-to-point topology) which is a lightweight protocol that can be managed by the Link Layer state-machine or firmware. The other is an extended protocol that supports other data types such as USB traffic and topologies such as daisy-chained sink devices. In the described embodiment, the packet-based interface signal is transmitted over a single lane on the main link. In other embodiments, two or four lanes may be used over the main link. In this case, the auxiliary channel can be disabled and can then be mapped to D+ and D−, which can then provide two main link lanes. Further details on the packet-based display interface are described in patent application Ser. No. 11/742,222, titled "Integrated Packet-Based Video Display Interface and Methods and Use Thereof," filed on Apr. 30, 2007. Packet-based interface configuration data fields that are relevant to voltage shifts are shown in Table 1 below.

Figure 3B:
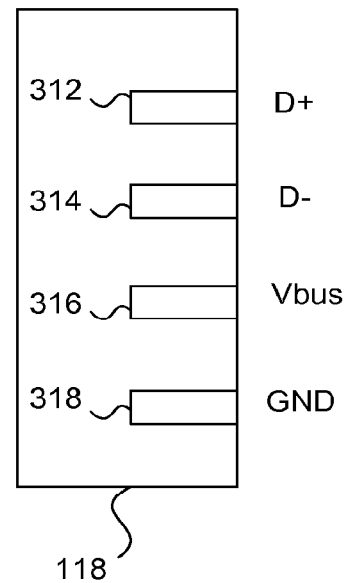
FIG. 3B is a block diagram of a serial interface receiving connector on a external display.

Returning now to the figures, FIG. 3B shows a serial interface receiving connector 118 on an external display 104. These pins correspond to the serial interface backward compatible portion of connector 110 in FIG. 2. There is a differential pair composed of a D+ pin 312 and a D− pin 314 that enable 480 Mbps transmission and are half-duplex and bi-directional. There is also a Vbus pin 316 for power (5V/500 mA for serial interface) and a GND pin 318.

In another embodiment, connector 116 of external display device 104 may have a different configuration when multimedia device 102 gets power from device 104 and when device 104 does not have a downstream USB port (i.e., no serial interface connection from external display device 104 to multimedia device 102). In this embodiment, phone 102 receives power from DP_PWR pin as well as from Vbus pin 316.

Figure 4:
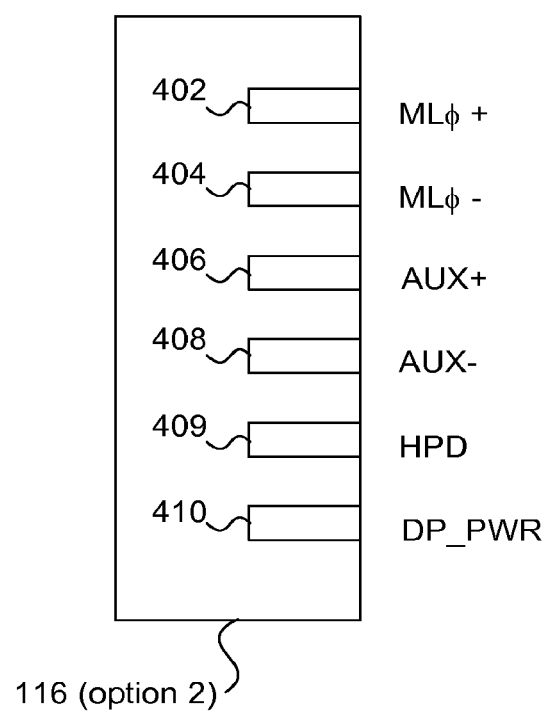
FIG. 4 is a pin diagram of a packet-based display interface receiver connector of an external display in accordance with an alternative embodiment.

A configuration connection 116 is shown in FIG. 4. Here the ML0+ pin 402 and ML0− pin 404 are the same as in FIG. 3A. The AUX CH+ pin 406 is also the same. Pin 409 is used for HPD. Pin 410 is sued solely for DP_PWR and is not shared with HPD. This is also the case with FIG. 3A, describing the first embodiment, where external display 104 has a USB downstream port with Vbus power. Recall that in the first embodiment, power is provided to multimedia device 102 via Vbus pin 316 on serial interface, that is, the backward-compatible connection portion. When external display device 104 is only a serial interface host (not a enhanced serial interface host), the power is limited to 5V/500 mA. In cable adaptor 106, AUX− (pin 408) and HPD (pin 409) are connected or mutexed, shown in more detail in FIG. 6 below.

Figure 5:
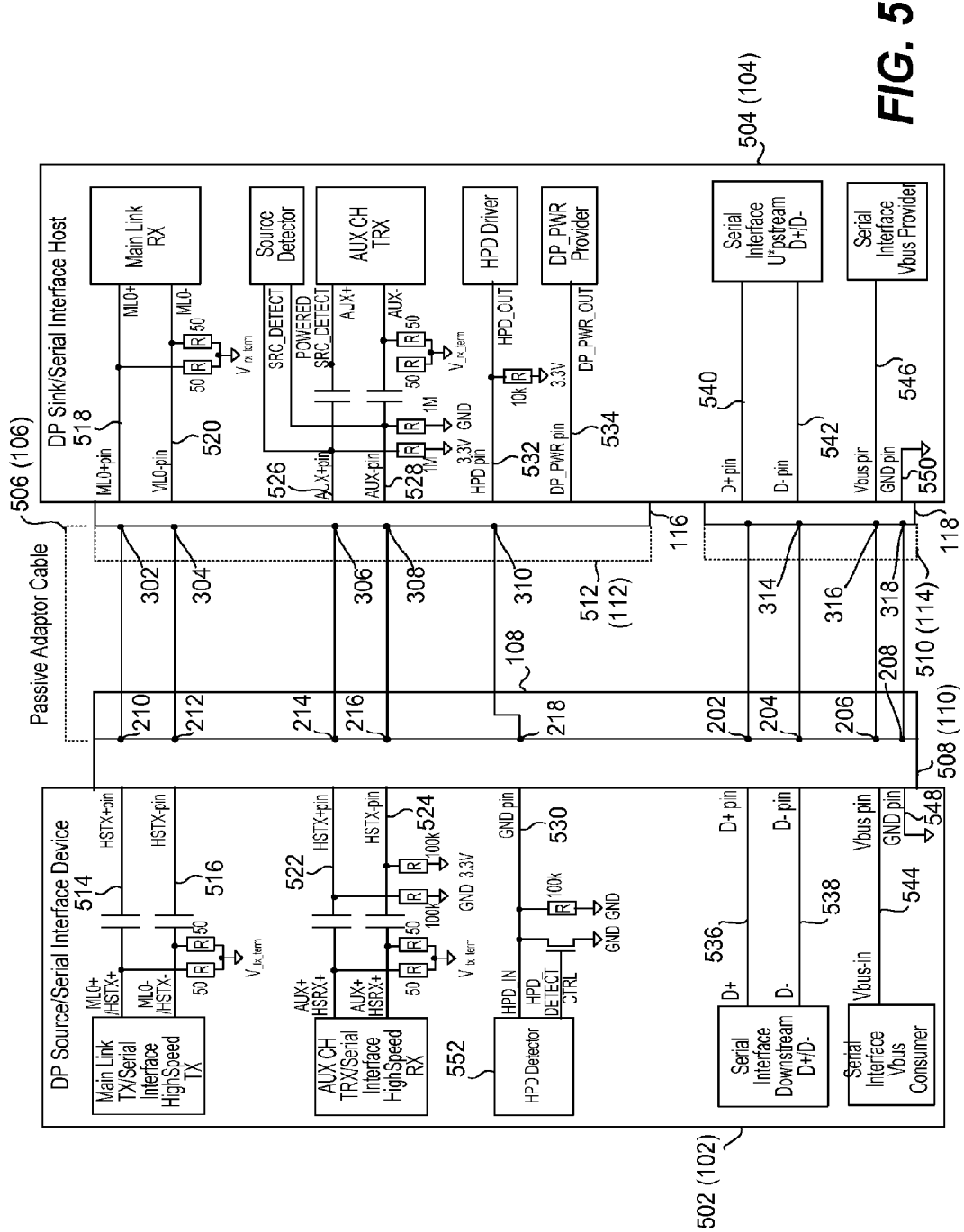
FIG. 5 is a detailed block diagram showing in greater detail the components of FIG. 1 in accordance with one embodiment.

FIG. 5 is a detailed block diagram shown in greater detail the components of FIG. 1 in accordance with one embodiment. The three basic components are multimedia device 102 shown as box 502, external display device 104 shown as box 504, and passive adaptor cable 106 shown as area 506. Connected to box 504 is enhanced serial interface receiver connector 110 shown as box 508. Packet-based interface source receiver connector 116 and serial interface receiver connector 118 are part of external display device 104.

Adaptor cable 106 is the data communication and simultaneous power-supplying device between multimedia device 102 and display device 104. As noted above, it has an enhanced serial interface plug connector 108 on one end that connects to receiver connector 110 on multimedia device 102. On the other end that connects to receiver connector 110 on multimedia device 102. On the other end are packet-based interface source plug connector 112 that plugs into receiver connector 116 and serial interface plug connector 114 that plugs into receiver connector 118.

The pins in all the receiver connectors and plug connectors are described in FIGS. 2, 3, and 4 and are shown in more detail in FIG. 5 (like number reference numbers are used for ease of explanation). Plug connector 108 has pins 202 and 218 as described in FIG. 2A. Interface source plug connector 112 has pins 302 and 310. Serial interface plug connector 114 has pins 312 and 318 as shown in FIG. 2B.

Multimedia device 102 has numerous components relevant to embodiments of the present invention. Starting with HSTX+ pin 210, a connection or line 514 leads to Main Link (ML) TX/enhanced serial interface HSTX component (as described above, ML pertains to the packet-based interface). Pin 210 maps to pin 302 to ML0+ having line 518 leading to Main Link RX in external display device 104. HSTX− pin 212 has a line 516 leading to the Main Link TX component. Pin 212 maps to pin 304 on display device 104 on the ML0− line to Main Link RX. HSRX+ pin 212 has a line 516 leading to the Main Link RX in external display device 104. HSRX+ pin 214 has line 522 leading to an AUX CH TRX/enhanced serial interface HSRX component. Pin 214 connects to AUX+ pin 306 having AUX+ line 526 leading to an AUX CH TRX component. There is also a stub on line 526 leading to the AUX CH TRX. The last pin of enhanced serial interface plug connector is GND pin 218 having an HPD_IN line 530 leading to an HPD Detector. Off of line 530 are two stubs, one labeled HPD_DETECT_CTRL that also leads to the HPD Detector. Pin 218 connects with pin 310 corresponding to an HPD pin having line 532 leading to an HPD Driver in display device 104. DP_PWR has a DP_PWR_OUT line 534 leading to DP_PWR Provider component.

The remaining pins are part of the serial interface backward compatible portion. D+ pin 202 has a D+ line 536 leading to a serial interface Downstream (differential pair D+/D−) component. A corresponding D− pint 204 has a line 538 leading to the same downstream component. Pins 202 and 204 connect with D+ pin 312 and D− pin 314 on external display device 104. Each has a line 540 and 542, respectively, that lead to a serial interface Upstream D+/D− component. A Vbus pin 206 has a Vbus_in line 544 leading to USB Vbus Consumer component. Pin 206 connects with Vbus pin 316 on display device 104 which has line 546 leading to a USB Vbus Provider component. Finally, GND pin 208 has a line 548 leading to ground as shown and is connected to pin 318 having a line 550 leading to ground in display device 104.

Figure 6:
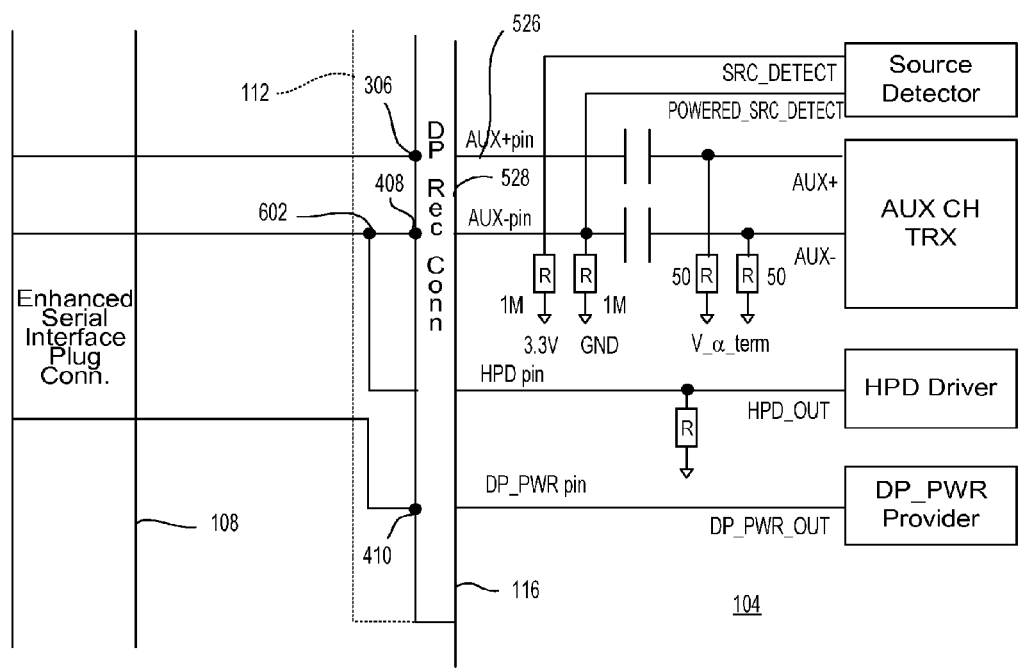
FIG. 6 is a block diagram of a packet-based interface source plug connector in accordance with an alternative embodiment.

FIG. 6 shows a second embodiment of packet-based interface source plug connector 112. Only the portion of connector 112 that is different from the embodiment in FIG. 5 is shown. At the top is shown AUX+ pin 306 having line 526 leading to the AUX CH TRX component with a stub for SRC_DETECT leading to a Source Detector. In this embodiment, HPD and AUX− are connected or multiplexed at 602 inside cable adaptor 106, specifically within connector 112. DP_PWR pin 410 does not share its pin with any other input/output. The other three pins, 402, 404, and 406, are the same as 302, 304, and 306 in FIG. 3A. In this embodiment, multimedia device 102 does not support full enhanced serial interface operation using HSTX/HSRX. This is the case even when phone 102 is not in packet-based interface source mode because there is an HPD signal stub 602 of the HSRX− line from multimedia device 102. Other features of this embodiment include multimedia device 102 getting powered from external display device 104 when device 104 does not have a USB downstream port since it receives power from DP_PWR pin 410 (part of enhanced serial interface) as well as from Vbus pin 316 (part of serial interface) as shown in FIGS. 3B and 5. Thus, total power to phone 102 is 5V/500 mA (or 900 mA if external display is enhanced serial interface) from Vbus pin 316 in addition to 3.3V/500 mA from DP_PWR pin 410. This embodiment also supports simultaneous operations of packet-based display interface source isochronous transport of AV streams with High Bandwidth Digital Content Protection (HCDP) and serial interface.

Figure 7:
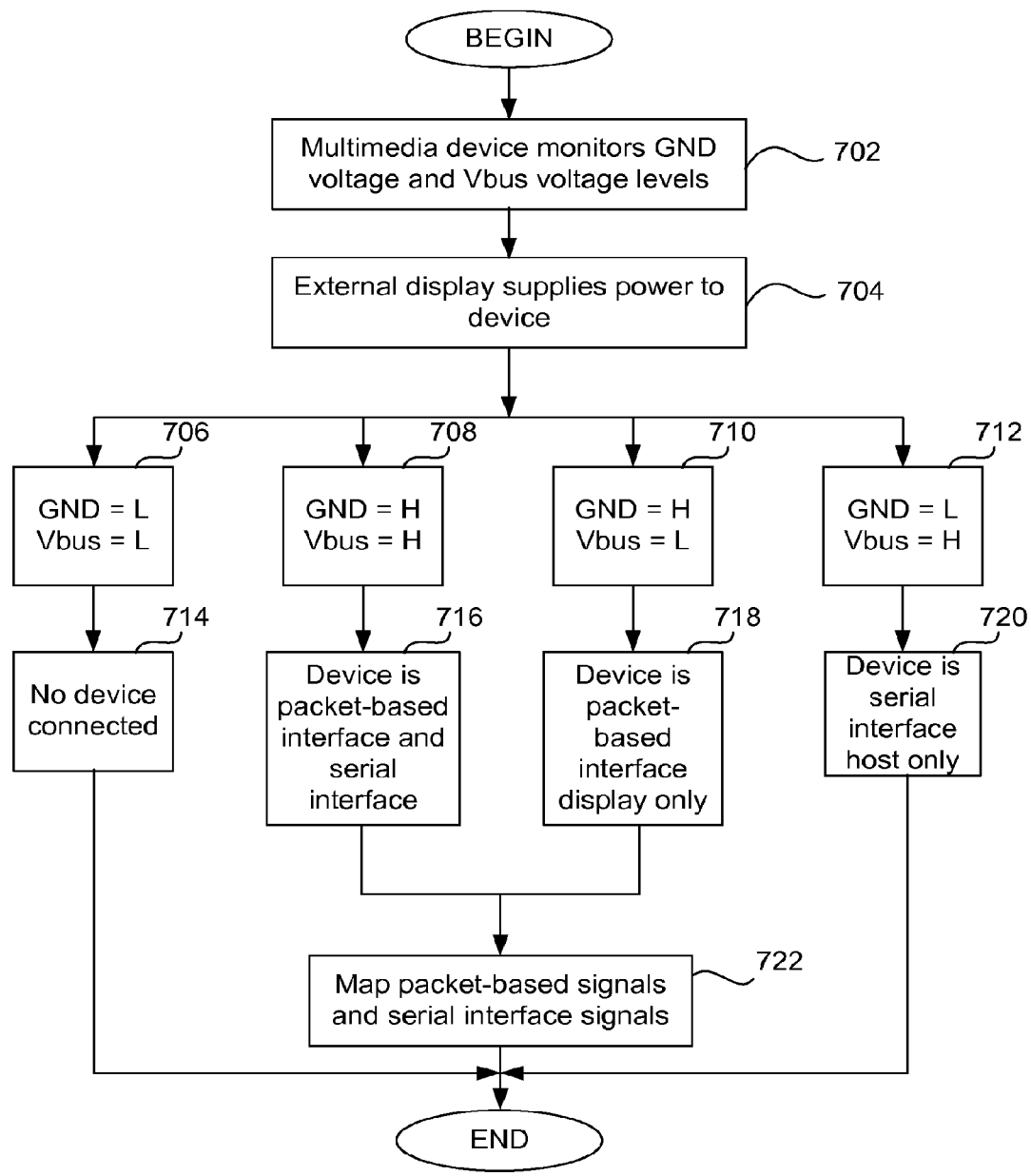
FIG. 7 is a flow diagram of a process of transmitting data and providing power between an external display device and a multimedia device in accordance with one embodiment.

FIG. 7 is a flow diagram of a process of mapping signals and providing power between an external display device and a multimedia device in accordance with one embodiment. In other embodiments, other types of handheld devices having enhanced serial interface or a standard serial interface and packet-based interface ports may be used. As noted above, the external display device may be a high-definition TV or other display device, such as a computer monitor. A user having a multimedia device with content on it, such as digital videos or pictures, wants to display the content on a larger display, typically an HDTV. At the same time, the user may want to charge the pone without having to plug the phone into an electrical outlet. The user would prefer to use a single cable between the phone and the display device to simultaneously display or download the content and power the phone. However, the user may not be aware of the specific capabilities of the TV or the phone, such as whether the phone is enhanced serial interface enabled or whether the TV has a packet-based digital display interface connector.

At step 702, the multimedia device is powered on and, as part of its normal operation, it monitors GND pin 218 voltage and Vbus pin 206 voltage. The action taken based on this monitoring is described after step 704. The passive cable adaptor of the present invention is used to connect the multimedia device with the external display. The adaptor cable has one end that is an enhanced serial interface plug connector which is inserted or engaged with an enhanced serial interface receiving connector on the multimedia device. It will not engage with a serial interface receiving connector. The other end of the cable connects to the external display, such as an HDTV. The display may or may not be enhanced serial interface equipped and similarly, it may or may not be packet-based interface-enabled. Once the multimedia device detects that a connection has been made by monitoring these pins, control goes to step 704 where the external display supplies power to the phone immediately if the external display is already powered on or as soon as the display is turned on. This power is supplied regardless of any other data transmissions that may be occurring between the phone and the external display, that is, no data needs to be transmitted between the two devices for power to be supplied from the external display.

Each pin (GND and Vbus) can be in one of two states: High or Low. Thus, there are four combinations of states or voltage levels. These are shown in boxes 706 to 712. To be complete, the simplest case (and one that is presumed to not be true because of actions taken at step 702), no device is connected to the multimedia device as shown in box 706. In this case the multimedia device detects that the GND pin and the Vbus pin are both low, thus nothing is connected as indicated in box 714 and the process ends. If the GND pin is H ("pulled up") and the Vbus pin is H, as shown in box 708, it is determined by the multimedia device that the external display or device connected to via the passive adapter cable has a packet-based digital display interface and is a USB host as indicated by box 716. The GND pin can only be pulled up if the device has a packet-based digital display interface. If the GND pin is H and the Vbus pin is L, it is determined that the external display only has a packet-based digital display interface and is not a USB host as indicated in box 718. Finally, if the GND pin is L and the Vbus pin is H as shown in box 712, the multimedia device knows that the external display is a USB host only as indicated in box 720 and the process is complete; no mapping takes place.

If the external device has a packet-based digital display interface (boxes 716 and 718), control goes to step 722 where a mapping is performed between the packet-based interface signal and the enhanced serial interface connector signal. At step 722 the HSTX signals are mapped to ML0+/− signals. As can be derived from the figures above, HSTX+ signals are mapped to ML0+ and HSTX− maps to ML0−. The HSRX signals are mapped to AUX+/− signals. More specifically, HSRX+ maps to AUX+ and HSRX− maps to AUX−. This is the mapping that takes place between the packet-based interface and enhanced serial interface and enables transport of AV streams or other types of digital data (with HDCP) between the phone and TV. These steps are done simultaneously with supplying power performed at step 704. At this stage the multimedia device and TV are connected and the TV is displaying data from the phone either via the packet-based digital display interface (and HXTX/HSRX) or via USB, and power is being supplied to the phone, as described in greater detail in FIG. 8.

Figure 8:
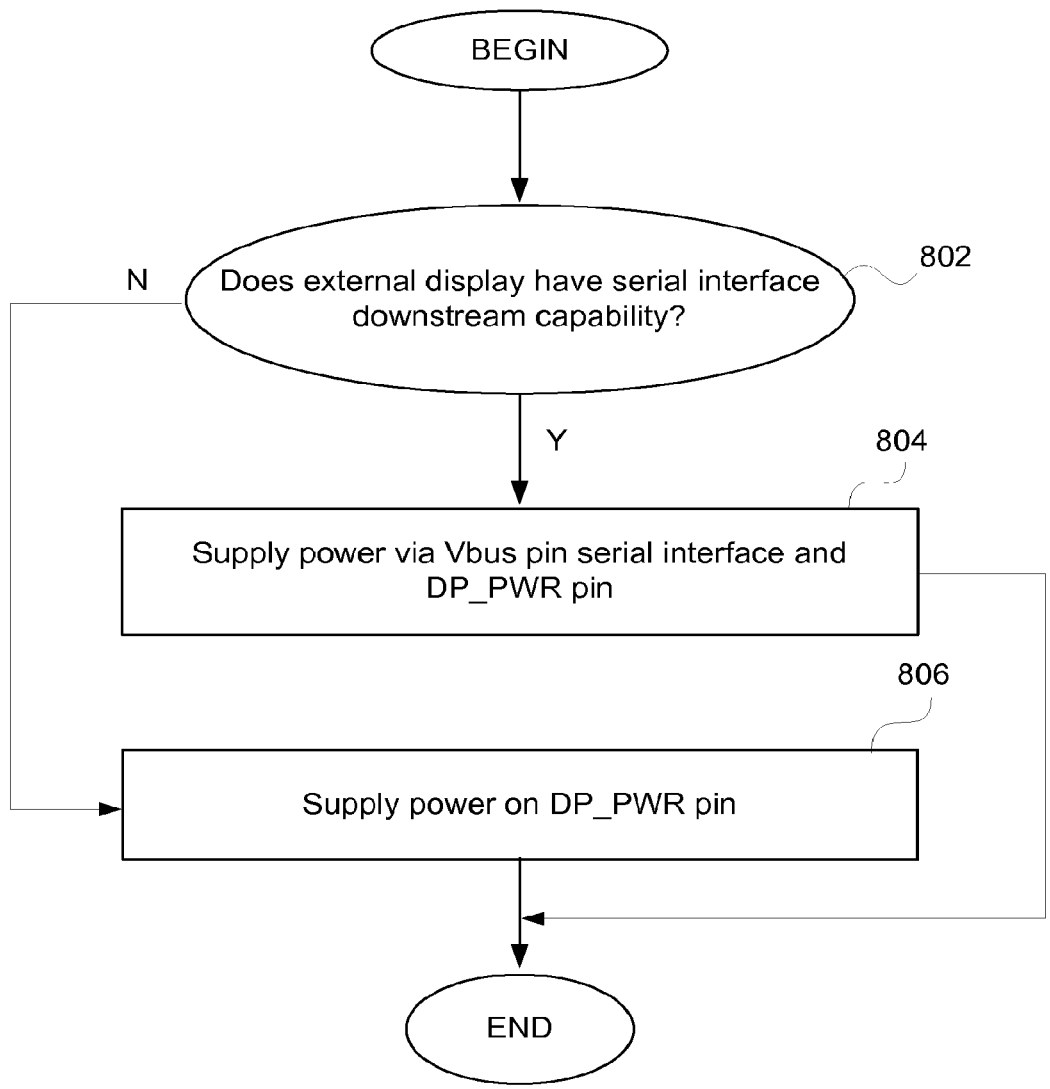
FIG. 8 is a flow diagram of a process of supplying power from the external display to the multimedia device in accordance with one embodiment.

FIG. 8 is a flow diagram of a process of supplying power from the external display to the multimedia device in accordance with one embodiment. It shows in greater detail step 704 of FIG. 7. At step 802 it is determined whether the external display device ahs serial interface downstream capability. This can be done using techniques known in the art. If the display does have downstream serial interface capability, then control goes to step 804 where power is supplied via the Vbus pin on the serial interface backward-compatible connector and through the DP_PWR pin, part of the packet-based digital display interface receiving connector. In one embodiment, the amount of power is 5V/500 mA. If the external display is an enhanced serial interface host, the power may be 5V/900 mA. If the external display does not have serial interface downstream capability, control goes to step 806 where power is supplied to the multimedia device on through the DP_PWR pin.

In another embodiment, if the multimedia device or other source determines that the HPD_DETECT_CTRL is low, this is an indication that the external display device is not an enhanced serial interface host. This determination can be made by the HPD Detector component 552. If HPD_DETECT_CTRL is not low, then the multimedia device has determined that the external display is an enhanced serial interface host.

Micro-Serial Interface Mapping

Figure 9:
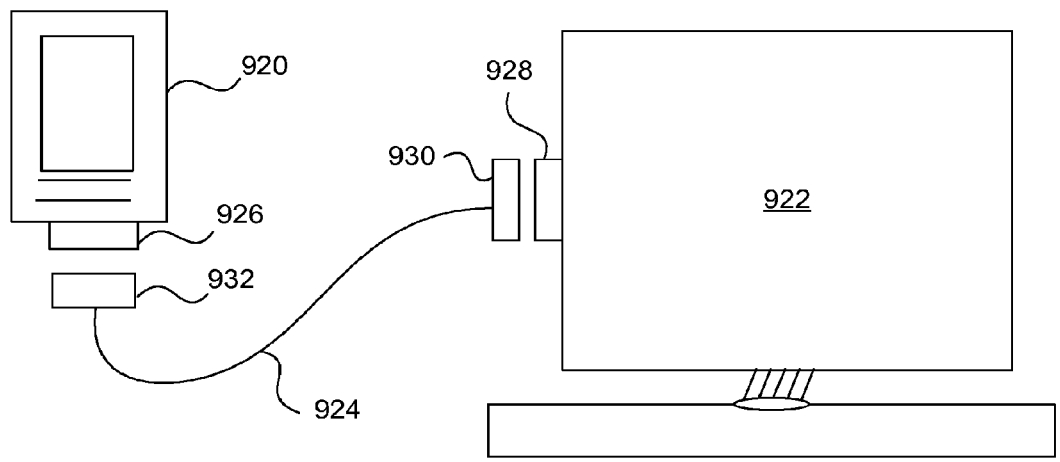
FIG. 9 is an overview block diagram showing a connection between a multimedia device and an external display device in accordance with one embodiment.

In another embodiment, packet-based digital display interface signals are mapped to signals of a micro version of the serial interface connector (hereafter "micro serial interface"). A micro serial interface connector has a smaller connector and is suitable for mobile and handheld devices for which a smaller connector would be more suitable than the standard serial connector. FIG. 9 is an overview block diagram showing a connection between a multimedia device and an external display device in accordance with one embodiment. A multimedia device 920 is connected to an external display device 922 via micro serial interface-to-packet-based interface cable adaptor 924. Multimedia device 920 has a micro serial interface receiver port 926. External display device 922 has a mated packet-based digital display interface receiver port 928. Cable 924 has a micro serial interface connector 932 at one end that couples with receiver port 926 on multimedia device 920 and a packet-based display interface connector 930 (at the other end) that couples with receiver port 928 on external display 922. As with the embodiments described above, multimedia device 920 acts as a packet-based interface source device (i.e., it provides the multimedia or AV data stream, video, audio, graphics, etc.). It may also act as a serial interface device. External display device 922, such as an HDTV may act as a packet-based digital interface sink device (i.e., it receives the multimedia/AV stream and displays it) and as a serial interface host device.

As described above, the packet-based digital interface protocol allows sideband communications that occur over auxiliary channels (AUX CH) to be completed before beginning main link transmission of the multimedia or other type of data. This allows the main link and the auxiliary channels to share the same differential pair (D+ and D−). As described above in FIG. 3B, a standard (i.e., not micro) serial interface connector has four pins: D+, D− (480 Mbps, half-duplex bi-directional), Vbus (power, 5V), and GND. Micro serial interface connector 932 has five pins. This type of connector is becoming increasingly common on handheld devices, such as multimedia devices, video cameras, gaming devices, and other portable devices. Four of the pins in connector 932 are the same as those in the standard serial interface and have the same characteristics, but with the addition of one pin that may be referred to as an "ID" pin for serial interface mobile support.

This ID pin is used for supporting serial interface mobile support on serial interface devices that can function either as a standard serial interface device or as a limited serial interface device. In one embodiment of the micro serial interface mapping technique described herein, this ID pin is used for mapping hot plug detect (HPD). That is, HPD (part of the packet-based digital display interface) is mapped to the ID pin of micro serial interface connector 932. The differential pair, D+ and D−, of micro serial interface, is mapped to the main link (ML) of the packet-based display interface communication 930. The auxiliary channel, AUX+ and AUX−, is mapped to the ID pin of micro serial interface connector 932. The Vbus pin of micro serial interface is mapped to DP_PWR pin of the packet-based display interface. Mapping to the ID pin of micro serial interface involves use of an AUX_HPD controller described below.

Figure 10:
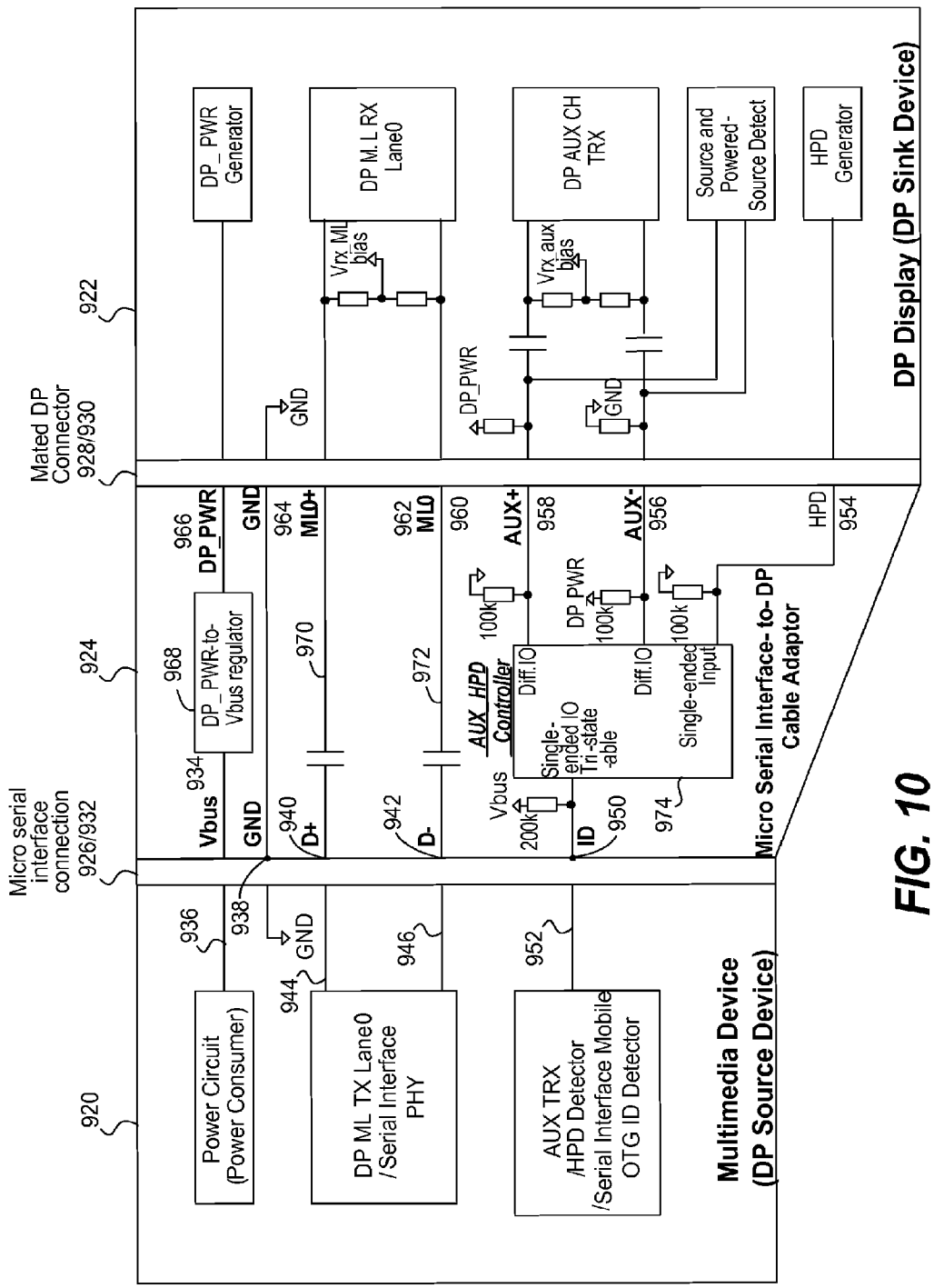
FIG. 10 is a block diagram showing in greater detail the components shown in FIG. 9 in accordance with one embodiment.

In one embodiment, a micro serial interface cable adaptor, as shown in FIG. 10, having HPD detection logic, path selection logic, and a differential switch, is used to connect a micro serial interface connector on the multimedia device to a packet-based display interface connector of an external display device, such as a TV. In this embodiment, the multimedia device has packet-based display interface output capability and the external display device is also packet-based display interface enabled (i.e., it can receive this kind of input). The cable adaptor having a micro serial interface plug connector at one end, has the ID pin of the micro serial interface connector tied to either Vbus voltage of the packet-based display interface or leaves the IP pin floating.

FIG. 10 is a block diagram showing in greater detail the components shown in FIG. 9 in accordance with one embodiment. On the left is multimedia device (packet-based display interface source device) 920 having connector 926, a standard micro serial interface connector having five pins, as described above. Connector 926 and components in multimedia device 920 are described first. Vbus pin 934 has a line 936 leading to a power circuit component (power consumer) in phone 920. GND pin 938 leads to ground as shown in phone 920. A D+ pin 940 and D− pin 942, comprising a differential pair, have lines 944 and 946, respectively, leading to a packet-based display interface main link (ML) TX lane 0/USB PHY component 948. ID pin 950 has a line 952 leading to a component 954 for AUX TX/RX and HPD detection and for serial interface mobile ID detection.

Now, display device 922, on the right side of FIG. 10 is described. It is, as noted, a packet-based display interface sink device. It has a packet-based interface connector 928 with various pins: HPD 954, AUX− 956, AUX+ 958, ML0− 960, ML0+ 962, GND 964, and DP_PWR (packet-based display power) 966. These pins have lines which lead to components in external display device (sink device) 922 as shown in FIG. 10.

Cable adaptor 924 in the middle of FIG. 10 is now described. It is a micro serial interface to packet-based interface mapping cable containing various components. Connector 932 at one end of cable 924 connects to the micro serial interface connector 926 of multimedia device 920. Connector 932 has five pins that couple to the pins in connector 926, namely, Vbus 934, GND 938, D+ 940, D− 942, and ID 950. The GND pins map to one other (pin 964 to pin 938). The DP_PWR pin 966 from external display 922 maps to Vbus pin 934 via a DP_PWR to Vbus regulator component 968. The main link (ML) pins ML0+ 962 and ML0− 960 of external display 922 connect to the differential pair, D+ 940 and D− 942, on the multimedia device 920. More specifically, ML0+ maps to D+ and ML0− maps to D−, via lines 970 and 972, respectively.

In one embodiment, the MicroUSB to packet-based display interface adaptor cable 924 has an AUX_HPD Controller 974 which has four signals. An AUX+ pin 958 and AUX− pin 956 (corresponding to the packet-based interface connector 930) are each differential IO, as shown in controller 974. The HPD pin 954 leads to a single-ended input in controller 974. On the micro serial interface connector 932 end, the ID pin 950 also leads to a single-ended IO in controller 974 which is also tri-stateable.

Controller 974 performs various functions. In one embodiment it performs conversion between single-ended AUX CH signal (on the multimedia device side) and the differential AUX CH signal (on the external display device side). Controller 974 also forwards the HPD signal from display device 922 to multimedia device 920. More specifically, when external display 922 generates an HPD pulse while an auxiliary channel (AUX CH) transaction is in progress in one embodiment, AUX_HPD Controller 974 forwards the HPD pulse as soon as the AUX reply transaction is completed (or if there is no reply, an AUX reply time-out occurs). In one embodiment, Controller 974 leaves the output portion of ID pin 950 tri-stated by default. With a resistor (e.g. 200 kΩ) as shown in FIG. 10.

In one embodiment, multimedia device 920, or any device with a micro serial interface connector and packet-based interface source capability, upon detecting Logic High level on ID pin 950 (a feature of the micro serial interface standard), may discover the presence of packet-based interface-to-micro serial interface cable adaptor 924 by various features. One is by weakly pulling down the ID signal via a 200 kΩ resistor and verifying that the ID signal remains at the Logic High level. In this manner, multimedia device 920 can verify that the ID signal is not floating, which indicates that adaptor cable 924 is connected. In another embodiment, the ID signal may be pulled down via a 20 kΩ resistor, followed by a verification that the ID signal is pulled down to Logic Low level, thereby indicating that the ID signal is not tied to Vbus 934. This also indicates that cable adaptor 924 is connected to multimedia device 920.

Multimedia device 920, having packet-based display interface-over-micro serial interface capability, interoperates with regular packet-based display interface external displays. As with other packet-based interface source devices, multimedia device 920 can support EDID read, audio/video stream transport, and HDCP content protection of premium A/V stream content. At 5.4 Gbps per lane (at High Bit Rate 2), packet-based interface-over-micro serial interface cable adaptor 924 is capable of transporting FHD60 Hz of uncompressed video stream.

In one embodiment, cable adaptor 924 is capable of performing an AUX CH handshake for discovering whether a high-voltage external display device is present. This can be enabled as described below. A packet-based interface downstream device (such as display device 922), acting as a DP_PWR (power) producer, generates 3.3V by defaults on DP_PWR pin 966 via connectors 928/930 (mated packet-based interface connector), according to the packet-based interface standard described above. A downstream device that is capable of generating a higher voltage, such as 12V+/−10% on DP_PWR pin 966, indicates that is has this capability by setting a 12V_DP_PWR_CAP bit (Bit 0) of a DP_PWR_VOLTAGE_CAP field to 1 (DP_PWR_VOLTAGE_CAP field corresponds to packet-based interface configuration data address 00010h). The upstream device, multimedia device 920, may enable the 12V DP_PWR of the downstream device by setting the 12V_DP_PWR_REQUEST bit (Bit 0) of a DP_PWR_VOLTAGE_SHIFT_REQUEST field to 1 (packet-based configuration data address 00119h). Clearing the bit to 0 sets the DP_PWR voltage back to +3.3V+/−10%. The downstream display device that is capable of generating 12V on DP_PWR pin 966 must be able to transition between 3.3V and 12V without causing a voltage spike on the DP_PWR power rail. In one embodiment, multimedia device 920 (upstream device) that requests a DP_PWR voltage shift avoids power-on reset and retains its states during the DP_PWR voltage shift.

Table 1 shows the packet-based interface configuration data fields that are relevant to DP_PWR voltage shifts in accordance with one embodiment. Although the DP_PWR (power) voltage shift of external display device 922 (downstream device) is of primary relevance to the packet-based interface signal mapping over micro serial interface cable adaptor 924, for completeness, Table 1 shows the fields for the power voltage shift of multimedia device 920 as well.

Addresses 00010h and 00119h are relevant to the DP_PWR voltage shift of the (downstream) external display device while 0011Ah and 02004h are relevant to the upstream device.

Figure 11:
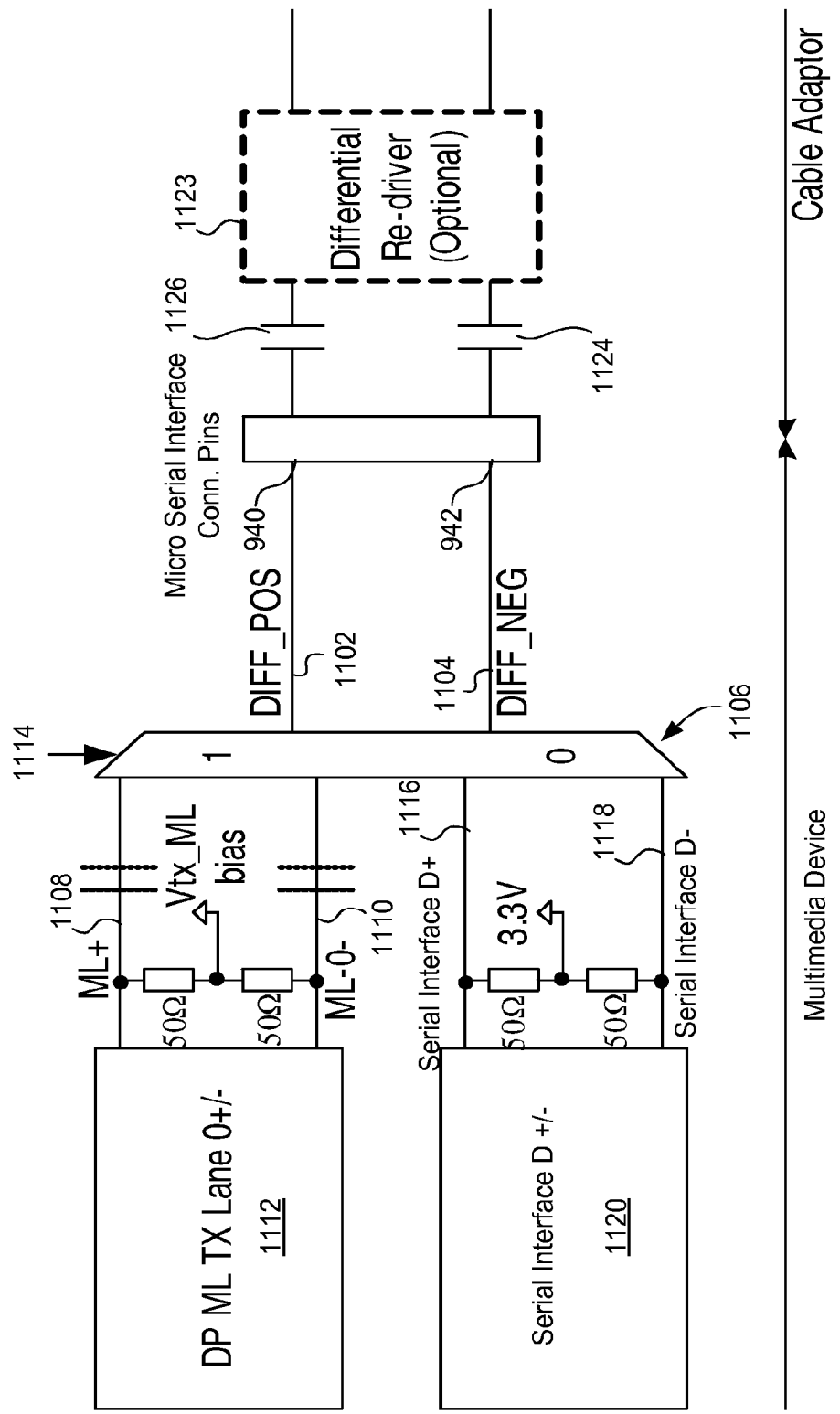
FIG. 11 is a block diagram of a device PCB having a passive bi-directional switch (multiplexer) in accordance with one embodiment.

As noted above, the same differential pair (D=/−) signal traces 944 and 946 in multimedia device 920 may be shared between the packet-based display interface main link (ML) 0+/− and serial interface D+/D−. In one embodiment, this may be done by placing a passive bi-directional switch (multiplexer) on the PCB of multimedia device 920. This is shown in FIG. 11. In this embodiment, it is important to ensure that placing the switch in the multimedia device 920 will not cause significant signal quality degradation.

Referring to FIG. 11, micro serial interface connector pins 940 and 942, shown initially in FIG. 10, have differential pair lines, DIFF_POS 1102 and DIFF_NEG 1104, (in the cable adaptor, they are D+940 and D−942) leading from the pins to a bi-directional f1315 1106. Switch 1106 has a "1" portion and a "0" portion. DIFF_POS line 1102 leads to the 1 portion and DIFF_NEG line 1104 leads to the 0 portion. Two lines from switch 1106, an ML0+ line 1108 and an ML0− line 1110 connect switch 1106 to packet-based interface main link (ML) TXLane 0+/− component 1112. Also shown are two 50Ω resistors and a Vtx_ML bias which is adjusted depending on whether packet-based digital display interface cable adaptor 924 is detected or not. A cable adaptor detect signal 1114 is transmitted to switch 1106. A cable adaptor can be detected as connected to multimedia device 920 using the techniques described above.

TABLE 1

ADDRESS MAPPING FOR PACKET-BASED INTERFACE CONFIG DATA (CD)

| CD Address | Definition | Read/Write over AUX CH |
|---|---|---|
| 00010h | DP_PWR_VOLTAGE_CAP<br>Bit 0 - 12 V_DP_PWR_CAP<br>1 - Downstream device capable of producing 12 V +/− 10% on the DP_PWR pin of its packet-based interface connector.<br>0 - Downstream device not capable of producing 12 V +/− 10%; 3.3 V +/− 10% only.<br>Bits 7:1 = RESERVED | Read only |
| 00119h | DN_DEVICE_DP_PWR_VOLTAGE_SHIFT_REQUEST<br>Bit 0 = DN_DEVICE_12 V_DP_PWR_REQUEST<br>1 - Requests for 12 V output on the DP_PWR pin of the packet-based interface connector of the downstream device. Don't care when DP_PWR_VOLTAGE_CAP field 12_DP_PWR_CAP bit is 0.<br>0 - Does not request for 12 V output on the DP_PWR pin of the DP connector of the downstream device. DP_PWR is 3.3 V +/− 10%.<br>Bit 7:1 - RESERVED | Write/Read |
| 011Ah | UP_DEVICE_DP_PWR_VOLTAGE_CAP_INDICATION<br>Bit 0 - UP_DEVICE_12 V_DP_PWR_CAP<br>1 - Indicates to the downstream device that this upstream device is capable of producing 12 V +/− 10% on the DP_PWR pin of its packet-based interface connector.<br>0 - Indicates to the downstream device that this upstream device is not capable of producing 12 V +/− 10% on the DP_PWR pin of its packet-based interface connector; 3.3 V +/− 10% only.<br>Bits 7:1 = RESERVED | Write/Read |
| 02004h | DEVICE_SERVICE_IRQ_VECTOR_ESI1<br>Bit 0 = RX_GTC_MSTR_REQ_STATUS_CHANGE<br>The status of RX_GTX_MSTR_REQ has changed. The RX_GTC_MSTR_REQ is readable at CD Address 00058h bit 0<br>Bit 1 = UN_DEVICE_12 V_DP_PWR_REQUEST<br>Bits 7:2 - RESERVED. Read all 0s | Bit 0 = Clearable Read Only. (B is cleared when '1' is written via an AUX CH write Transaction.)<br>Bit 1 = Read Only |

A USB D+ line 1116 and a USB D− line 1118 connect switch 1106 with a serial interface D=/− component 1120. This component and component 1112 are represented collectively as packet-based interface ML TX Lane0/serial interface PHY component 948 in FIG. 10. Also shown in FIG. 11 is an optional differential re-driver 1123 in cable adaptor 924. Cable adaptor 924 may also have AC-coupling caps 1124 and 1126. These may also be placed in multimedia device 920.

Figure 12:
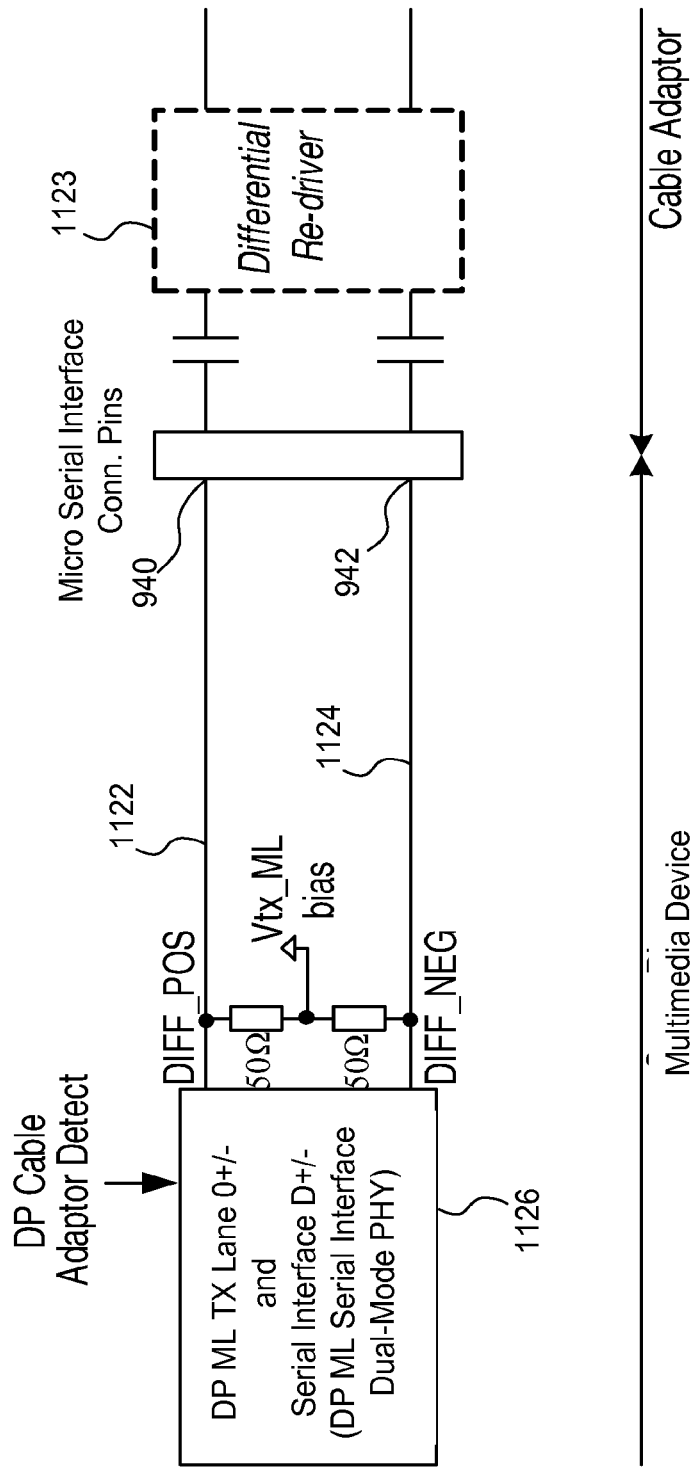
FIG. 12 is a block diagram of a device PCB where a packet-based ML TX PHY and a USB PHY share the same pads in accordance with an alternative embodiment.

In another embodiment, the packet-based ML TX PHY and the USB PHY share the same pads as shown in FIG. 12. Micro serial interface connector pins 940 and 942 have a DIFF_POS line 1122 and DIFF_NEG line 1124 leading to a packet-based ML/USB Dual-Mode PHY component 1126. As in the first embodiment, cable adaptor 924 may have a differential re-driver 1123. A Vtx_ML bias adjusts depending on whether cable adaptor 924 is detected.

In one embodiment, the standard serial interface may be implemented using USB2.0 and the enhanced serial interface may be implemented using USB3.0. High speed transmission (HSTX) may be implemented by Super Speed transmission signals in the USB3.0 standard. Similarly, high speed transmission (HSRX) may be implemented by SuperSpeed receiver signals in USB3.0. Micro serial interface may be implemented by the MicroUSB2.0 standard for mobile and handheld devices. The mobile support of the serial interface of the described embodiment may be implemented by the On-The-Go (OTG) pin in the MicroUSB2.0 standard. Of course, other standards having a serial interface may also be used to implement the described embodiments.

Figure 13:
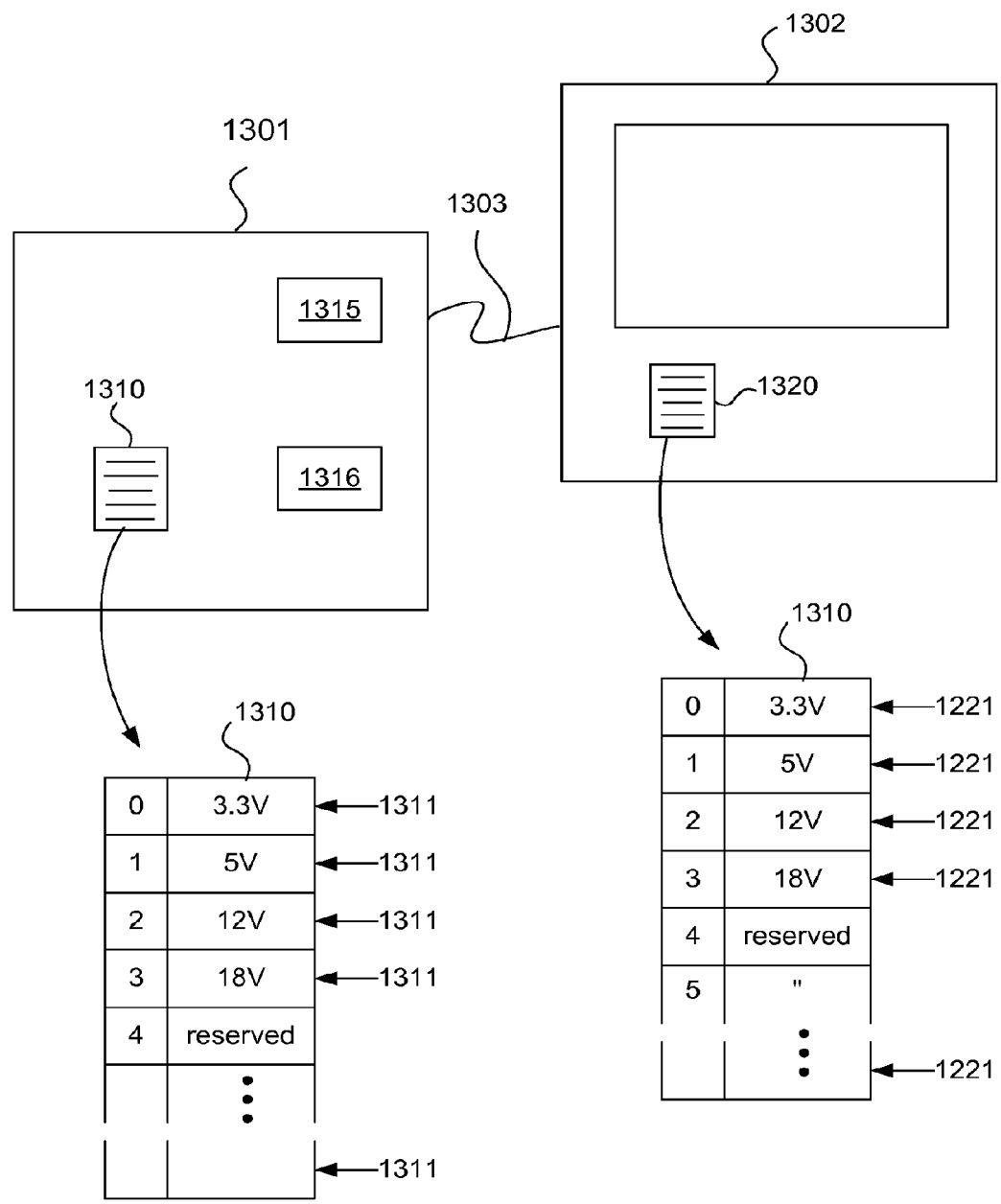
FIG. 13 is a simplified network diagram showing a multimedia device connected to an external display device via a cable in accordance with one embodiment.

In another approach, modes of transmitting power, to a source device, at various levels is described. For example, as illustrated in FIG. 13, a source multimedia device 1301 is connected with a multimedia display device 1302 using a connector 1303 of a type described herein. Such a connector 1303 supports the transmission of multimedia data through a main data link (such as the data pair described above), the transmission of sideband signals through an auxiliary channel, as well as power connection such as described above. Numerous ancillary connections such as those previously described can also form part to the connector 1303. The devices and connections shown here can be of the same type described in FIG. 1.

In one particular useful implementation, the source multimedia devices 1301 can be mobile telephones, gaming devices, handheld devices, as well as the devices described above.

In one embodiment, the source device includes a data processor 1315 suitable for generating or otherwise supplying multimedia content to the display device 1302. This processor is capable of transmitting multimedia data content to the display through a connector interface system coupled with the connector 1303 enabling the multimedia content to be transmitted to the display. Also, the source is configured to receive power from the display device through the connector 1303. Also, the source can include power level determination circuitry 1316 which is configured to enable the desired power to be transmitted to the source from the display. It is pointed out that in some embodiments, the power level determination circuitry 1316 can instead form part of the display device 1302.

In many common implementations such handheld devices 1301 operated using 3.3 V power using current on the order of about 500 mA at about 1.5 W. However, for certain devices, greater current levels are required. It is to be noted that the power connections described herein use power connections of a finite diameter and thus can impose a limit on the current transmitted by such connectors. This problem becomes worse as longer connectors 1303 are used. Moreover, for some devices, greater current levels are required.

The present invention can take advantage of particular types of display devices configured to address this problem. Display devices can be configured to transmit power at a number of different power levels depending on the device configuration. Thus, display device embodiments can be configured to transmit power at several different voltage levels. This can be matched up with voltage levels that a source device can operate in consonance with.

In one example implementation, a display 1302 is configured to support power transmission at a multiplicity of different levels. For example, as shown here the display 1302 includes a power configuration field 1320 that describes the power transmission capabilities of the display device. For example, the field can include an array of memory registers 1321 that are used to store the various power capabilities supported by the display. In one example, the power configuration field can comprise a set of read/write registers. As shown here, the display can support power transmission at 3.3V, 5V, 12V, 18V, and has some number of reserved address spaces suitable for other power levels.

In complementary example, a source device 1301 is configured to support operating power at a multiplicity of different levels. For example, as shown here the source 1301 includes a power capacity field 1310 that describes the operating power capability of the source. For example, the field can include an array of memory registers 1311 that are used to store the various operating power levels supported by the display. In one example, the power capacity field 1310 can comprise a set of read only registers. As shown here, the source can support operating power transmission levels of 3.3V, 5V, 12V, 18V, and has some number of reserved address spaces suitable for other power levels.

Thus, a supported power transmission capability of the display device 1302 can be synchronized with a supported operating power level of the source device 1301. In embodiments of the invention, a priority system can be used to identify preferred voltage levels for a source device thereby enabling a preferred power level to be supplied in preference to a less preferred power level.

Figure 14:
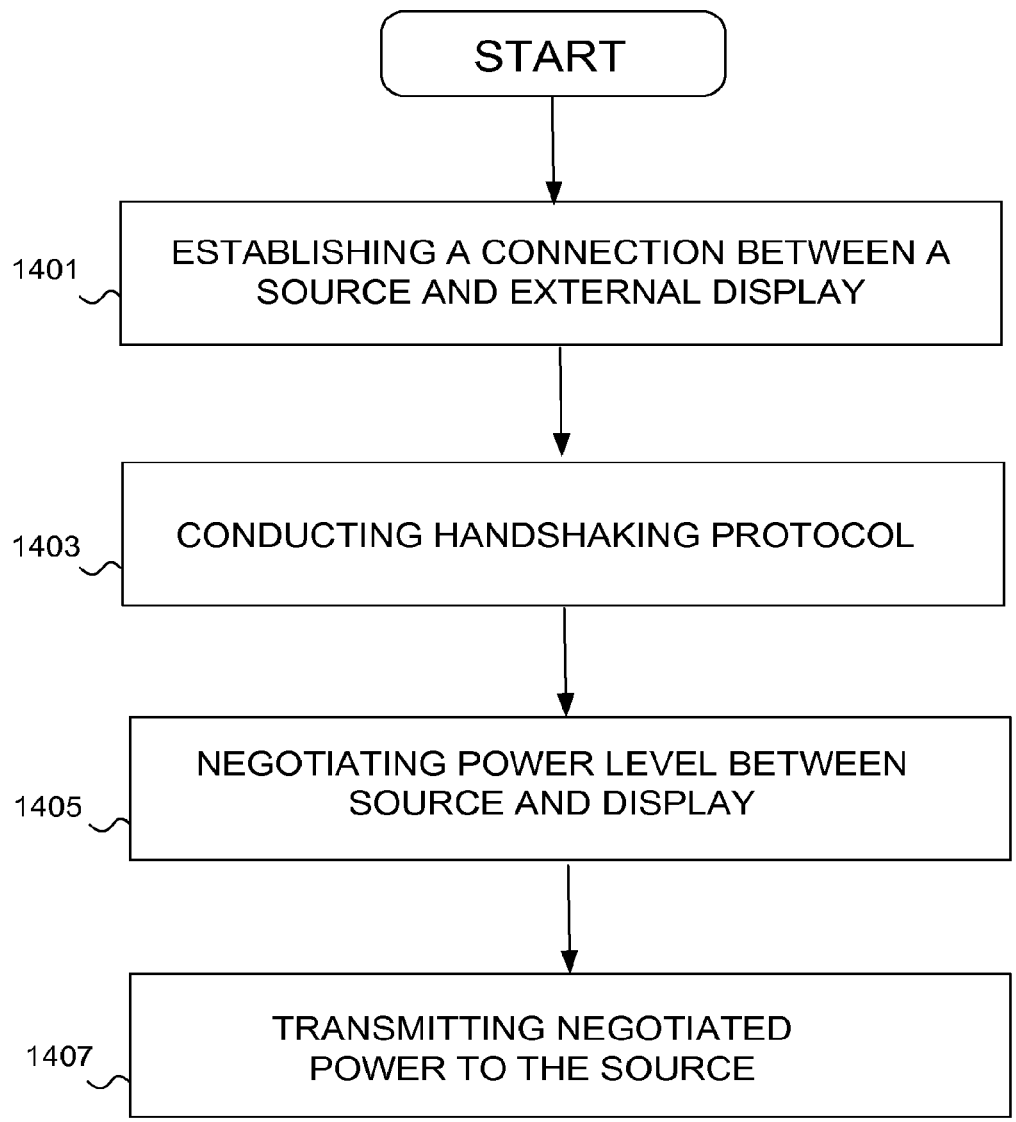
FIG. 14 is a flow diagram of a process of providing power from an external display device to a multimedia device in accordance with one embodiment.

FIG. 14 is a flow diagram that describes one possible implementation methodology suitable for use in accordance with the principles of the present invention.

In use, a source multimedia device 1301 is coupled with a display device 1302 using an appropriately configured connector. A connection is thereby established between a multimedia source 1301 and a display device 1302 (Step 1401). For example, a hot plug detect (HPD) message can identify that the connection between source 1301 and display 1302 is made. A handshaking protocol (Step 1403) can be performed to identify connections, capabilities, and modes of communication between the source 1301 and display 1302. For example, a hot plug detect (HPD) message can identify that the connection between source 1301 and display 1302 is made and the handshake can be used to establish discover the characteristic of the devices 1301, 1302 as well as specify operating parameters and characteristics. Typically, the handshake will be implemented as a set of messages and acknowledgements sent via the auxiliary channel.

Importantly, a power level is negotiated between the source and display (Step 1405). This is the power level in which power will be communicated from display to the source device. Typically, this is accomplished during a handshaking protocol but need not be so.

In one example process such negotiation can be accomplished as follows. A starting default power level is used at the beginning of the negotiation. For example, 3.3V can operate as the starting power level. The source device will access the display power capability. For example, the source device 1301 can read the registers of the display power configuration field 1320. If the 3.3V power level is not compatible with both source and display another further negotiation occurs until a compatible power level is determined. For example, where both the source 1301 and the display 1302 are operable at a voltage level of 12V, that level can be used. In addition, where a priority is specified by the source device, and several power levels satisfy the display and source capabilities, a preferred power level can be provided by the display.

If no compatible power level can be determined the source device will use its local power source (i.e., typically a battery) to power the source device 1301.

Once a negotiated power is determined, the display 1302 transmits power to the source device 1301 via the power lines of the connector 1303 (Step 1407). For example, once a power level is negotiated, the source can send a message via the auxiliary channel indicating that the source is to send power at the negotiated level.

The display 1202 will send an ACK message via the auxiliary channel. The display will switch to or otherwise implement the negotiated power (e.g., 12V). The negotiated power will be sent from display 1202 to the source device 1201 which receives the power and can use this power to operate the source systems. As can be expected the power is supplied at the same time as multimedia data is transmitted from source to display.

In another implementation, the power level determining circuitry 1316 of the source device 1201 can be configured with some added capacity enabling the following method embodiment. The power level determining circuitry 1316 of the source device 1201 can include a current level detector. In one such embodiment, during a handshaking protocol the power level can also be negotiated between the source and display.

In one example process such negotiation can be accomplished as follows. A starting default power level is used at the beginning of the negotiation. For example, 3.3V can operate as the starting power level. The display will provide the power at 3.3V (or at some other supported power level) and the source device will determine an associated current level as supplied through the power line of the connector. In one implementation, the source can examine each power level supported by the display device. In other words each supported power level is supplied to the source and a current level is determined for each power level. When a desired or preferred current level is achieved, a negotiated power level is thereby determined and supplied to the source device.

In another implementation, the source can calculate the relationship of the supplied voltage to the actual current received at the source. This relationship can be used to calculate anticipated current based on the voltage supplied by the display device. In such a case, the source 1301 can again access the display power configuration field 1320 and use a similar calculation to approximate the current level produced at each voltage level supported by the display device 1302. For example, if a 3.3V power level produces only about 140 mA of current by the source requires a current of about 500 mA, greater voltage will be required. Further negotiation occurs until a compatible power level is determined. For example, where both the source 1301 and the display 1302 are operable at a voltage level of 12V, that level can be used to generate the desired 500 mA. Also, as before if no compatible power level can be determined, the source device 1301 will use its local power source (i.e., typically a battery) to power the source device.

In addition, embodiments of the present invention further relate to integrated circuits and chips (including system on a chip (SOC)) and/or chip sets or packages. By way of example, each of the devices described herein may include an integrated circuit chip or SOC for use in implementing the described embodiments and similar embodiments. Embodiments may also relate to computer storage products with a computer-readable medium that has computer code thereon for performing various computer-implemented operations. The media and computer code may be those specially designed and constructed for the purposes of the present invention, or they may be of the kind well known and available to those having skill in the computer software arts. Examples of tangible computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor. In addition to chips, chip systems, and chip sets, the invention can be embodied as firmware written to said chips and suitable for performing the processes just described.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modification as are suited to the particular use contemplated. It is intended that the scope of the invention by defined by the following claims and their equivalents.

What is claimed is:

1. A cable adaptor to connect a data source device with a display device, the cable adaptor comprising:
   a packet-based interface connector at a first end having a positive main link pin, a negative main link pin, a positive auxiliary channel pin, and a negative auxiliary channel pin;
   an auxiliary and HPD controller coupled to the positive auxiliary channel pin and the negative auxiliary channel pin; and
   a micro serial interface connector at a second end, wherein the cable adaptor is configured to concurrently pass multimedia content and electrical power, the electrical power supplied at a negotiated power level via a power-to-Vbus regulator component.

2. A cable adaptor as recited in claim 1, wherein the packet-based interface connector further comprises:
a pin for hot plug detect (HPD) signals.

3. A cable adaptor as recited in claim 1, wherein a main link positive signal is mapped to a positive differential signal (D+) node and a main link negative signal is mapped to a negative differential signal (D−) node.

4. A cable adaptor as recited in claim 1, wherein the auxiliary and HPD controller is configured to pass two differential input/output signals, an ID signal, and an HPD signal.

5. A cable adaptor as recited in claim 1, further comprising:
a plurality of A/C-coupling capacitors.

6. A cable adaptor as recited in claim 1 further comprising:
a differential re-driver.

7. A cable adaptor as recited in claim 3 further comprising:
a bi-directional passive switch coupled to the positive differential signal (D+) node and the negative differential signal (D−) node.

8. An adaptor comprising:
a hot plug detect (HPD) circuit;
a power-to-Vbus regulator;
at least one cable section configured to concurrently pass data and a negotiated level of electrical power, the negotiated level of power associated with the power-to-Vbus regulator;
a first connector on a second end of the at least one cable section; and
a second connector on a first end of the at least one cable section, the second connector including a positive main link pin, a negative main link pin, a positive auxiliary channel pin, and a negative auxiliary channel pin, wherein at least one of the first connector and the second connector is a micro serial interface connector.

9. The adaptor of claim 8 wherein the first connector is a micro serial interface connector.

10. The adaptor of claim 8 wherein the first connector is configured to pass signals that conform to a universal serial bus (USB) protocol and the second connector is configured to pass signals that conform to a DisplayPort protocol.

11. The adaptor of claim 8 wherein the data is packet-based multimedia content.

12. The adaptor of claim 8, comprising:
at least one pin coupled to the HPD circuit and configured to pass hot plug detect (HPD) signals.

13. The adaptor of claim 8 wherein the positive main link pin is mapped to a positive differential signal (D+) node and the negative main link ping is mapped to a negative differential signal (D−) node.

14. The adaptor of claim 8, comprising:
at least one A/C coupling capacitor coupled to the positive main link pin; and
at least one A/C coupling capacitor coupled to the negative main link pin.

15. The adaptor of claim 8 wherein the first connector includes at least seven pins and the second connector includes at least 5 pins.

16. An adaptor cable, comprising:
a first connector on a first end of the adaptor cable, the first connector including a power pin, a ground pin, and two differential signal pins;
a second connector on a second end of the adaptor cable, the second connector including a positive main link pin, a negative main link pin, a positive auxiliary channel pin, and a negative auxiliary channel pin;
integrated circuitry between the first connector and the second connector, the integrated circuitry including:
a power-to-Vbus regulator configured to concurrently pass data and a negotiated level of electrical power; and
a hot plug detection controller, wherein at least one of the first connector and the second connector is a micro serial interface connector.

17. The adaptor cable of claim 16 wherein the first connector is configured to pass signals that conform to a universal serial bus (USB) protocol and the second connector is configured to pass signals that conform to a DisplayPort protocol.

18. The adaptor cable of claim 17 wherein the first connector is a micro serial interface connector.

19. The adaptor cable of claim 17 wherein the integrated circuitry is configured to pass packet-based multimedia data.

20. The adaptor cable of claim 17 wherein the integrated circuitry is configured to convert between single-ended AUX CH signals and differential AUX CH signals.

21. The adaptor cable of claim 17 wherein the integrated circuitry is configured to forward a hot plug detect (HPD) signal from the second connector to the first connector.

* * * * *